United States Patent [19]

Leonard

[11] 4,254,686

[45] Mar. 10, 1981

[54] OCTAVE SUBDIVIDED DIATONIC SCALE ORGANIZER

[76] Inventor: Verna M. Leonard, 9360 N. Blackstone, Space 278, Fresno, Calif. 93710

[21] Appl. No.: 67,944

[22] Filed: Aug. 20, 1979

[51] Int. Cl.³ .............................................. G10G 1/02
[52] U.S. Cl. .................................... 84/481; 84/479 A
[58] Field of Search ................................. 84/471–475, 84/478–483 R, 485

[56] References Cited

U.S. PATENT DOCUMENTS

| | | | |
|---|---|---|---|
| Re. 24,195 | 8/1956 | Wallace | 84/485 SR |
| 3,101,023 | 8/1963 | Weis | 84/480 X |
| 3,350,973 | 11/1967 | Weis et al. | 84/478 |

Primary Examiner—Lawrence R. Franklin
Attorney, Agent, or Firm—Ralph S. Branscomb

[57] ABSTRACT

The invention is in the field of musical learning and playing devices, and particularly relates to keyboard instruments. A plurality of cards are provided each of which defines a forward pocket and each of which spans an octave on the keyboard. These cards are positioned adjacent to one another across the breadth of the keyboard, and a second group of insert cards are inserted into the pockets defined by the first cards. These second cards may be one of several types, but in any event they display indicia which register with keys on the keyboard, and each of these cards also includes a laterally extended tab which engages the adjacent card by overlapping same so that the entire line of cards is stationary as a unit rather than being completely separate. The indicia on the insert cards may be scale tones identifying a chord, or the notes on a musical staff, but in either case the presence of the fixed octave-spanning cards and the varied insert cards clarifies the superimposition of the structure of written music on the octave structure.

5 Claims, 7 Drawing Figures

OCTAVE SUBDIVIDED DIATONIC SCALE ORGANIZER

BACKGROUND OF THE INVENTION

In order to understand written music, it is necessary to analyze the written notes. When notes are played from the staff, there is no visible clue to the way they are put together. There is only one clue to aid in this analysis of the written notes which is the "chord symbol". A chord symbol stands for a group of notes called a chord, containing two or more notes, played together. The student sees a chord symbol over a melody line, and he immediately transfers his mental image of the chord symbol to the piano keyboard.

The reason for this is that chords on a keyboard are physically alike. The notes of a chord are structured in any of the octaves of a keyboard. They can be played, physically identically, in all seven octaves. It is repeated in each octave, over and over, with the keys remaining alike in all octaves and only the sound pitch changing from one octave to the next.

Each octave can be given a name, such as octave one, two, etc. This informs the student "where" to play the chord on the keyboard. The written notes do not show this similarity in notes and octaves.

It is the purpose of the instant device to give each note of the chord a specific number across the keyboard, and then the locating of the chord can be accomplished by locating a specific piano key having a number and transferring this number to the written notes on a clef (treble or base). By using the seven octaves of the keyboard as a general locator for notes found in a certain key signature, and then breaking up the chord into an identity for each single note of a chord, and then finding the name of the chord by using a chord symbol, it becomes an easy matter to analyze the chord in written - note form. The chord symbol is transferred above the melody line and the student has already analyzed the chord from the scale on the keyboard, and his keyboard analysis enables him to read "groups of notes" by chord symbols instead of one note at a time.

SUMMARY OF THE INVENTION

The present invention is an apparatus of the immediately above-mentioned type and provides a plurality of pocket-defining cards which are inserted behind the keys of the keyboard, each spanning the notes constituting one octave. These cards can be positioned side by side behind the keys to subdivide the keyboard into octaves in any of the twelve possible ways.

In addition to these cards, which may also have indicia setting forth the positions of the notes of the diatonic scale printed along the bottom, a second set of cards is provided for inserting into pockets defined by the first set of cards. These insert cards have a row of indicia which registers with selected notes on the pocket-defining cards and identify chords, scales, and any other arrangement of notes desired. In addition, each card has a laterally extending tab which overlaps and thus engages an adjacent card so that the entire structure when spread across the keyboard is more or less held together coherently. These tabs also may have indicia to register with the scale tones on the pocket card belonging to the adjacent octave.

DETAILED DESCRIPTION OF THE PREFERRED EMBODIMENT

Figure 2:
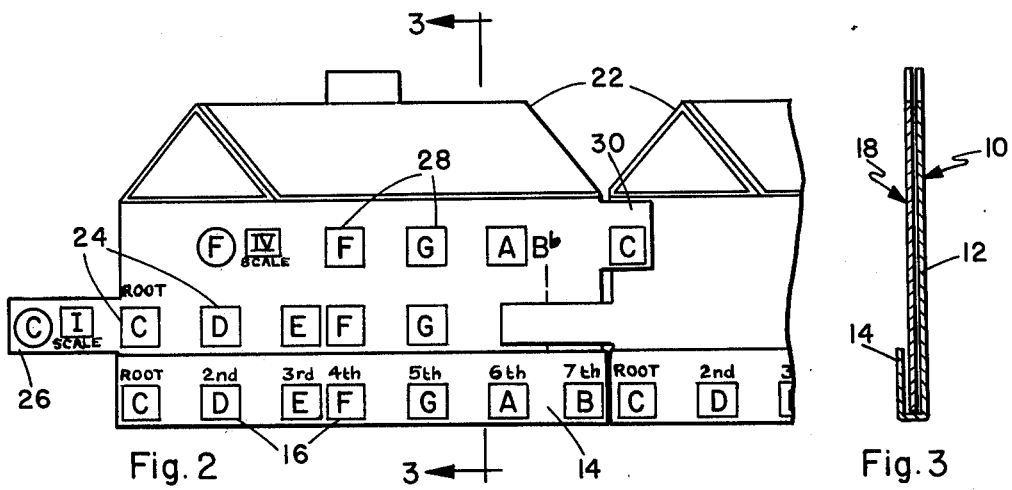
FIG. 2 is a front elevation view of the cards shown in FIG. 1.
Figure 3:
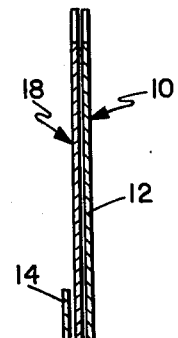
FIG. 3 is a sectional view taken along line 3—3 of FIG. 2.

The invention includes two basic parts which are best identified from FIG. 3, the first being a pocket-defining card 10 having an upright back portion 12 and a front flap 14, there being a display of indicia on the front flap such as is shown in FIG. 2 identifying the scale tones 16 of a diatonic scale. The key of C has been chosen for convenience, although the key signature can be changed if a variant set of pocket cards is desired.

Figure 1:
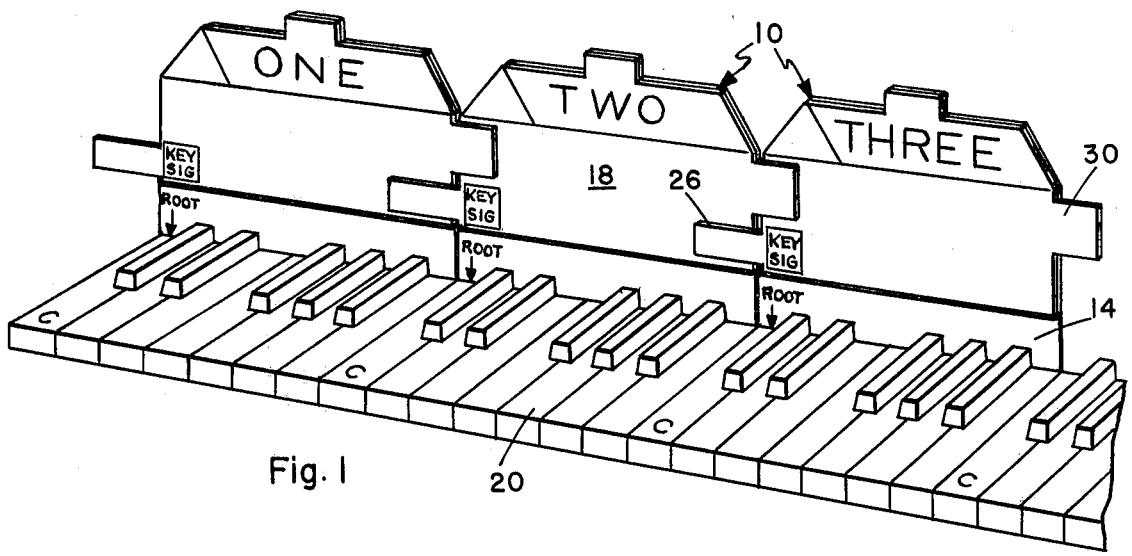
FIG. 1 is a perspective view of a keyboard showing the cards of the present invention in use.

The second major element of the combination, referring to FIG. 3, is an insert card generally referred to at 18, which comes in several different embodiments. Generally speaking however, the insert cards fit within the pockets of the pocket-defining cards and display one of several variant orderings of indicia which register with either or both the indicia 16 or the actual keys of a piano keyboard. Although these two cards can be laid flat, ideally they should be arranged as shown in FIG. 1 behind the keys of a piano keyboard 20. It will be noted that the C keys of the keyboard 20 have been indicated and because the pocket cards 10 are designed for the key of C, each card begins on that key.

It is intended that ordinarily the pocket cards 10 would remain in place and a variety of different insert cards 18 could be used to achieve different goals. For example, insert card 22 as represented in FIG. 2, utilizes a first row of scale tones 24 which identify a C chord in the key of C which registers with the corresponding scale tones called forth at 16. This card has left tab 26 which may or may not be used to interlock with the adjacent card. Immediately above the row 24 of indicia is a second row 28 which sets forth an F Chord, also in the key of C and related to the C Chord according to the Roman numeral IV in the cycle of fourths. The uppermost scale tone of the F chord is disclosed on the right tab 30 and registers with the diatonic scale tone of the envelope card to the right of the card featured in FIG. 2. This registration serves to illustrate how the scales overlap and may fall from one octave into the next, and also the tab 30 serves to physically interlock the adjacent card. Ordinarily there would be a series of the insert cards interlocking one another as best seen in FIG. 1, perhaps spanning the entire keyboard, and whereas only the C and F chords are shown, conceivably each card could display a stack of key signatures as many as twelve high displaying all the important related chords in a particular key signature.

Figure 4:
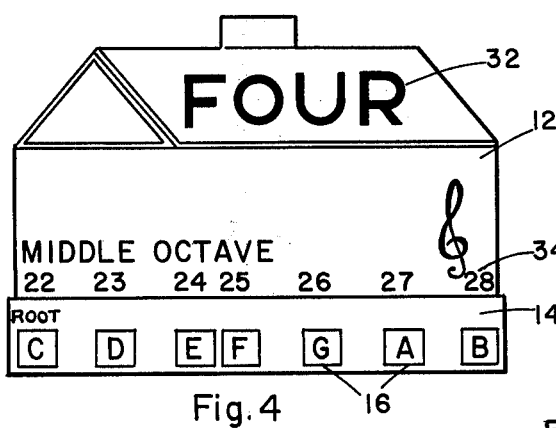
FIG. 4 is a front elevation view of a pocket-defining card.

FIG. 4 is a front elevation view of a pocket-defining card isolated from the insert card. It can be seen that this card is identified at the top at 32 by octaves so that it is known precisely where to position this card on the keyboard. This is necessary because on this particular pocket-defining card the scale tones of the diatonic scale are numbered consecutively at 34 starting with the lowermost note of the diatonic scale in octave 1. A series of eight such numbered cards would, of course, be required. The utilization of these consecutive numbers enables a student, by removing the insert card, to be aware of an exact number assigned to each of the scale tones in each octave which removes the ambiguity of having just the scale tone letter named by itself, with no octave designation.

Figure 5:
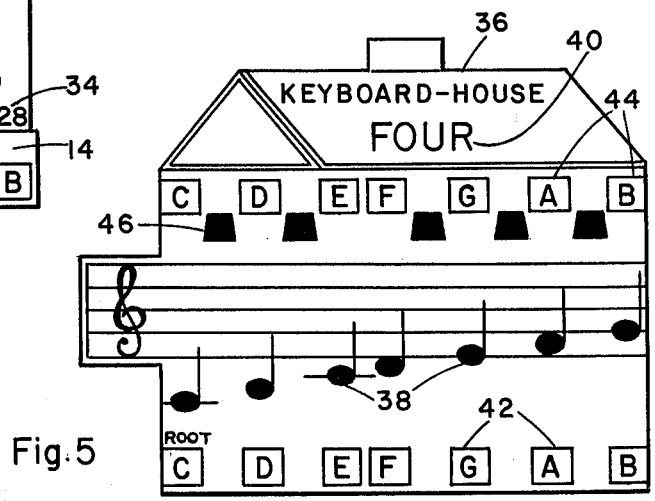
FIG. 5 is a front elevation view of a modification of the insert card having one tab.

An insert card 36 is shown in FIG. 5 having notes 38 on a staff, as opposed to letter-named scale tones, which register with the underlying identified scale tones of the diatonic scale on the pocket-defining card. An optional row of scale tones 42 may be included which would be out of sight when the card is inserted in the pocket-defining counterpart. For this reason the scale tones are duplicated at 44 and the card includes spaces 46 for the inscription, if desired, of the other notes in the chromatic scale which do not appear in the diatonic scale.

Figure 6:
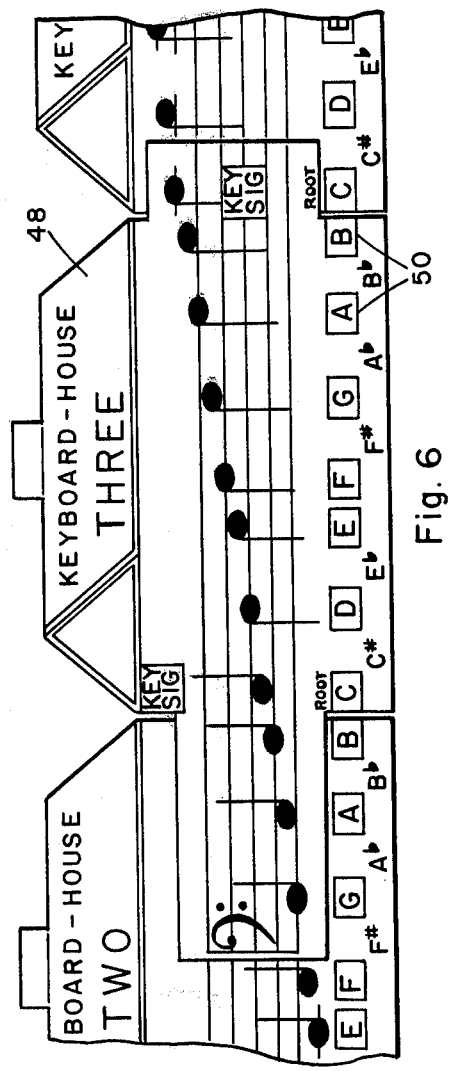
FIG. 6 is a front elevation view of a note-bearing card engaging adjacent cards.

The card is expanded in FIG. 6 into a longer card 48 having tabs extending from both ends to overlap adjacent cards. Otherwise, the concept is the same as the card 36, and includes the provision of registering the lower end of the notes on the staff with the scale tones of an adjacent chord to emphasize the overlap of the range of music from one octave to the next. The same overlap is apparent at the upper end of the scale as represented by the right hand tab of card 48.

Figure 7:
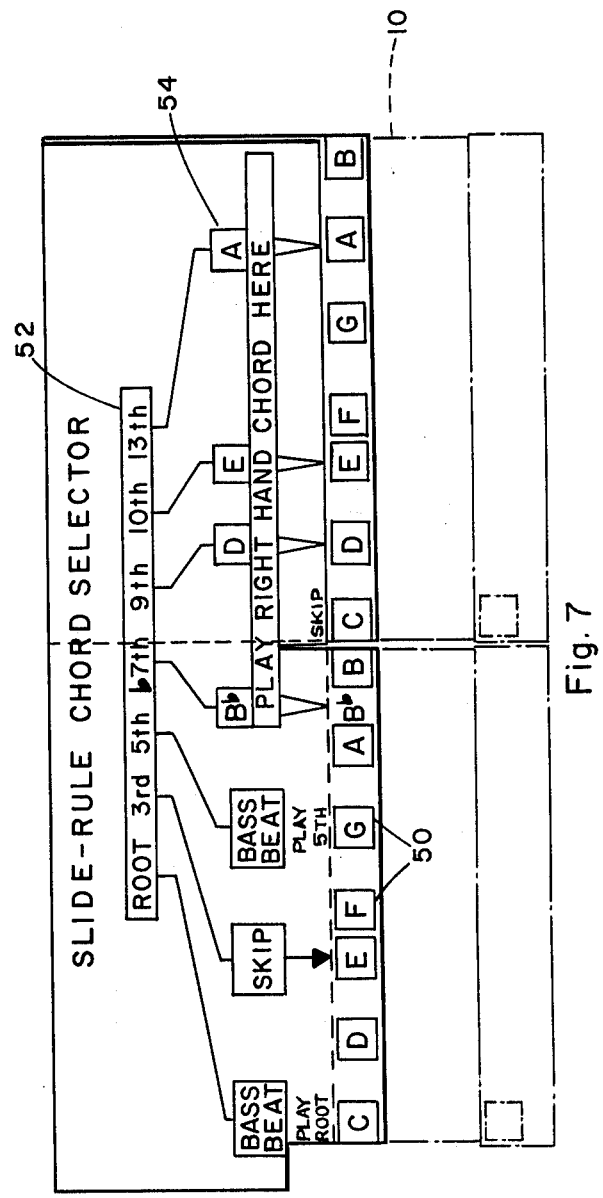
FIG. 7 is a front elevation view of a modified dual octave insert card.

Another modification of the embodiment is shown in FIG. 7 which illustrates a double-octave insert card. In this embodiment, the same pocket-defining cards 10 are used, shown in phantom, but a diatonic scale 50 spans two octaves and is registered by chord-defining indicia 52. In this particular example, the thirteenth chord is used which clearly spans from one octave to the next and thus cannot be represented by a single octave card. Further indicia 54 incorporates rhythm information with the chord naming indicia for alternative uses of the scale tones ordered in this fashion.

The invention described provides for the combination of consecutive, numbered octaves having thereon consecutively numbered diatonic scale tones beginning with the lowest note on the keyboard and ending with the highest. The bifurcated nature of the scale as a continuum on the one hand with octave quanta on the other is thus graphically disclosed. Interfacing with this structure are the various insert cards described above which adds to the above-indicated block of informaton the order of registering of written notes, scales, and scale tones of chords with the underlying diatonic scale, emphasizing the spillover of notes and tones from one octave to the next.

I claim:

1. An aid to understanding the using a musical keyboard comprising:
   a. a plurality of pocket-defining cards dimensioned to insert behind the keys of said keyboard and to collectively span more than one octave of said keyboard, each of said cards spanning a single octave of said keyboard;
   b. each of said cards having ordered indicia displaying the scale tones of a diatonic scale of a particular key signature, said scale tones being spaced to register with corresponding keys of said keyboard when said cards are inserted therebehind;
   c. a plurality of insert cards, each having a depending panel dimensioned to insert into one of the pockets defined by said pocket-defining cards; and
   d. each of said insert cards having indicia to register with certain of said scale tones and also having a laterally extended tab to physically overlap and engage an adjacent insert card.

2. The structure according to claim 1 wherein indicia on each of said insert cards comprises the scale tones of a chord overlapping into two octaves, and at least one of said scale tones is displayed on said tab to register with a scale tone displayed on a pocket-defining chord in an octave adjacent that octave spanned by the pocket-defining card in which the respective insert card is inserted.

3. The structure according to claim 1 wherein the indicia on each of said insert cards comprises a plurality of horizontal rows of scale tones each defining a chord related to a single key signature.

4. The structure according to claim 1 wherein the indicia on each of said insert cards defines notes on a musical staff and said staff and said scale extended into said tab, and each of said notes corresponds with a key on the underlying keyboard.

5. The structure according to claim 1 wherein each one of said pocket-defining cards represents a preselected octave on a piano keyboard and is so identified by octave number, the ordering indicia on said insert cards define the scale tones of a diatonic scale, and said scale tones are numbered consecutively on said pocket-defining cards starting with the first note in the first octave.

* * * * *